Sept. 9, 1930.    R. L. LE BOEUF    1,775,532
WELDING DEVICE
Filed Sept. 16, 1929
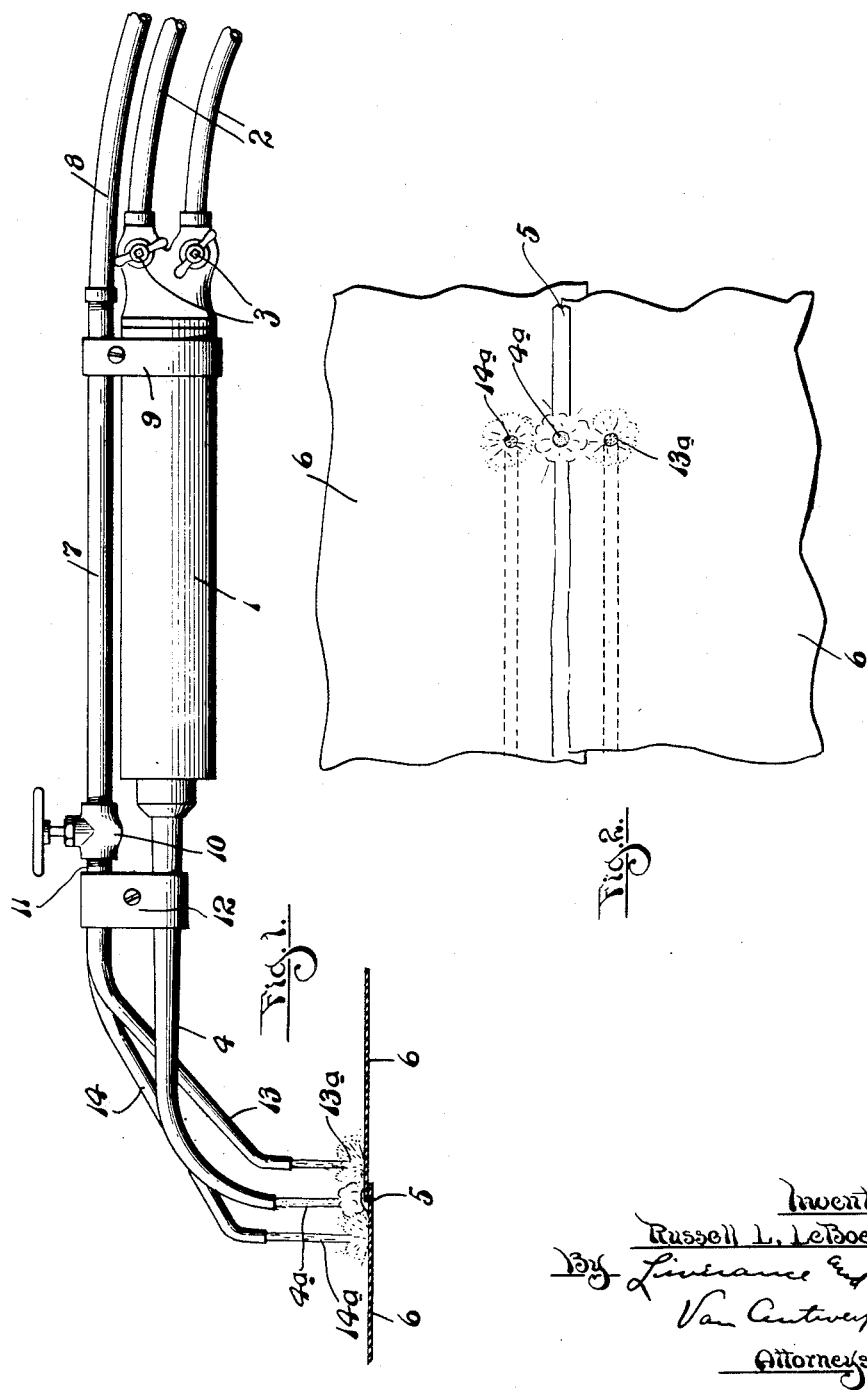

Patented Sept. 9, 1930

1,775,532

UNITED STATES PATENT OFFICE

RUSSELL L. LE BOEUF, OF MUSKEGON HEIGHTS, MICHIGAN, ASSIGNOR OF ONE-FOURTH TO A. J. BRICKNER AND ONE-FOURTH TO H. W. KROPF, BOTH OF MUSKEGON HEIGHTS, MICHIGAN

WELDING DEVICE

Application filed September 16, 1929. Serial No. 393,062.

This invention relates to welding and is more particularly concerned with welding of the type known as oxy-acetylene welding wherein a torch is held in the hand and has a nozzle from which the burning fuel is ejected against the metal to be welded and against the welding material which is placed over the break, joint or seam to be welded.

In welding of this character, particularly in welding sheet metal, the heat which is developed by the burning gases is rapidly absorbed by the sheet metal which expands considerably adjacent the weld, causing a buckling and warping of the sheet metal. This has been attempted to be overcome by holding the metal securely in welding jigs or the like which, in many instances, are large and cumbersome and very expensive to make.

It is a primary object and purpose to equip the welding torch in oxy-acetylene welding with a means for directing a cooling liquid to the metal at each side of the weld so as to absorb the heat which would otherwise cause the sheet metal to warp or buckle and in this way eliminates the using of jigs, cooling plates and the like and the expense thereof, both in the matter of production and of labor in placing the sheet metal therein for welding, the effect produced being that of maintaining the area directly adjacent where the head is applied and the welding is occurring cool and thus eliminating undesired expansion and buckling.

An understanding of the invention for the attainment of the ends stated, as well as other not at this time particularly enumerated, may be had from the following description taken in connection with the accompanying drawing, in which, Fig. 1 is an elevation of the welding torch of my invention.

Fig. 2 is a plan illustrative of the welding operation as performed with the torch of my invention.

Like reference characters refer to like parts in the different figures of the drawing.

The welding torch includes a barrel 1 enclosing a mixing chamber into which two tubes 2 lead at one end for carrying the gases used, control of which is had by means of valves 3 as shown. The mixed gases from the chamber within the barrel 1 pass outwardly through a nozzle 4 with which they may be directed against the section or seam 5 which is to be welded in sheet metal plates 6 as shown. The gases passing from the nozzle 4 burn and produce intense heat which heats the plates at the weld and melts suitable welding material which fuses with the metal of the plates so as to produce the weld required.

With the improvement which I have made in welding torches of this character, a tube 7 is located lengthwise of and above the barrel 1, a conducting tube 8 is attached one end to said tube 7 to carry water under pressure thereto. The tube 7 and barrel 1 are secured together by means of any suitable securing clip indicated at 9. Tube 7 leads to the end of the barrel 1 and threads into a valve housing 10 from which an outlet tube 11 leads, the same being connected to the nozzle 4 by a clip 12 similar to the clip 9 previously described. The tube 11 is divided, its two branches 13 and 14 being bent downwardly and located one at each side of the end of the nozzle 4.

In the welding operation water is projected from the ends of the nozzle parts 13 and 14 against the metal 6, as indicated by the streams 13a and 14a at each side of the weld or the parts of the metal being welded, and heat conducted by the metal is taken up by the water thus projected against the metal, maintaining the metal cool and preventing expansion of the parts heated. The streams of water follow the welding flame at each side thereof as the torch is moved to bring the flame along the seam which is welded and there is no warping and buckling of the sheet metal due to high temperature effects produced from heat conduction by the metal to the parts thereof adjacent where the heat is applied. The control of the water is readily had through the valve indicated at 10 so that a greater or less amount may be projected on the metal as may be desired.

This invention has proved very practical and useful particularly in conjunction with welding sheet metal such as linings for refrigerators and the like. The invention is defined in the appended claims and is to be considered comprehensive of all forms of structure coming within their scope.

I claim:

1. In a device of the class described, a welding torch having a nozzle from which gases adapted to be burned are projected, and additional nozzles located one at each side of the first nozzle, combined with means for conducting a cooling liquid to said additional nozzles for projection therefrom against work being heated and welded by the burning gases from the first nozzle, at points short distances from where the work is being heated.

2. In a construction of the class described, a welding torch comprising a mixing chamber wherein gases for welding are mingled, a nozzle extending from one end of the mixing chamber, a tube located lengthwise of and outside of said mixing chamber, said tube being divided at one end to provide two diverging nozzles, the ends of which extend to and are located short distances from the ends of the first nozzle, and means for securing said tube in fixed relation to the mixing chamber and the first mentioned nozzle, said tube being adapted to carry water or equivalent cooling fluid to deliver the same from the nozzle associated therewith.

3. A construction containing the elements in combination defined in claim 2, combined with a control valve in said tube for controlling the quantity of cooling liquid passing therethrough.

4. The herein described process of welding which consists, in projecting burning gases against metal to be heated and welded, and simultaneously projecting water against said metal a short distance at each side of the place where the burning gases are acting on the metal.

In testimony whereof I affix my signature.

RUSSELL L. LE BOEUF.